May 26, 1925.
C. P. CASS
1,538,926
FLUID PRESSURE BRAKE
Filed March 21, 1923
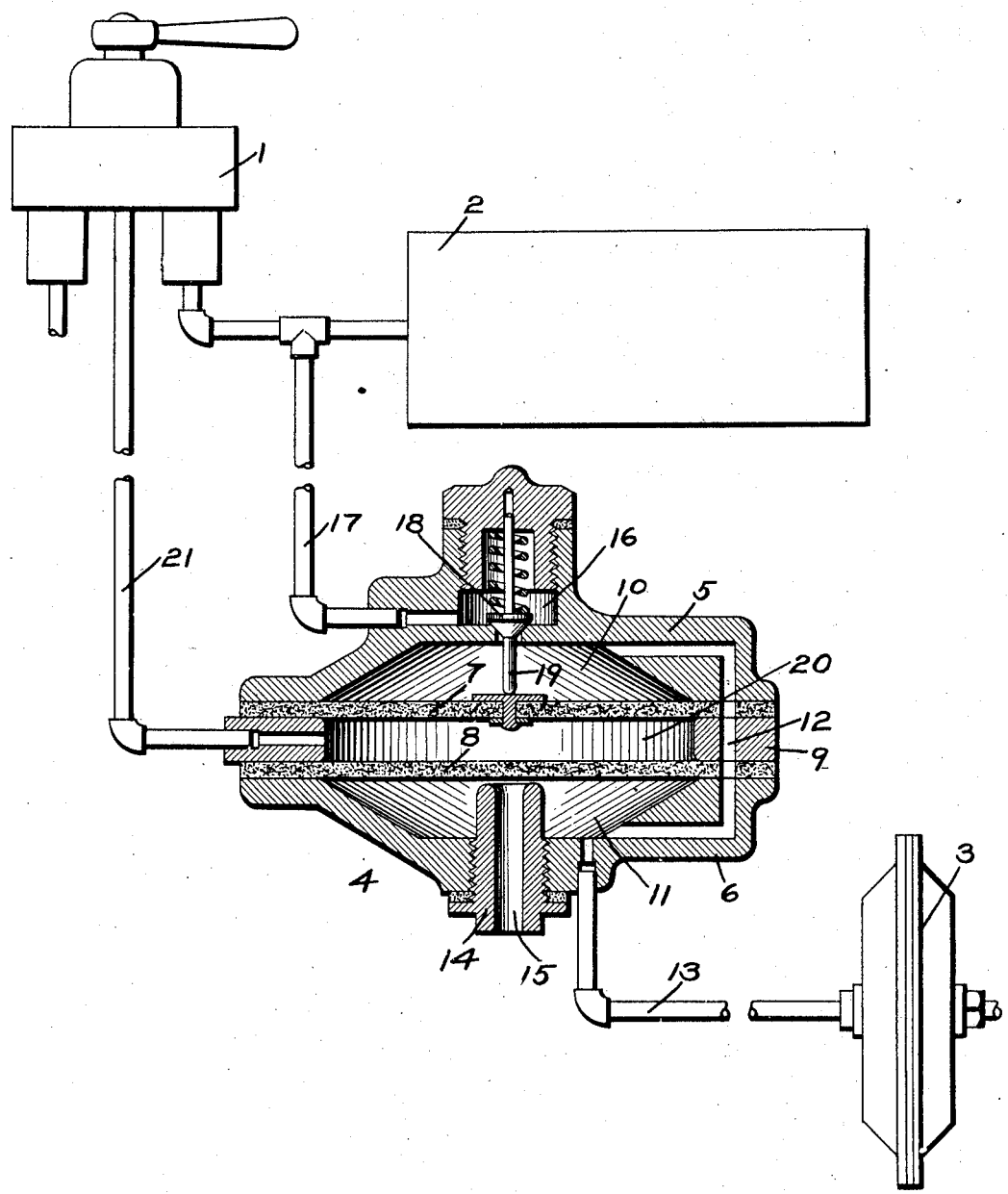
INVENTOR
CHRISTOPHER P. CASS
BY *Wm. W. Cady*
ATTORNEY Patented May 26, 1925.

1,538,926

UNITED STATES PATENT OFFICE.

CHRISTOPHER P. CASS, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed March 21, 1923. Serial No. 626,672.

*To all whom it may concern:*

Be it known that I, CHRISTOPHER P. CASS, a citizen of the United States, residing at Berkeley, in the county of Alameda and State of California, have invented new and useful Improvements in Fluid-Pressure Brakes, of which the following is a specification.

This invention relates to fluid pressure brakes, and more particularly to a fluid pressure brake for an automotive vehicle.

The principal object of my invention is to provide an improved quick application and release valve device for controlling the quick supply of fluid under pressure to and its release from the brake cylinder or brake chamber.

In the accompanying drawing, the single figure is a diagrammatic view of a fluid pressure brake equipment embodying my invention.

As shown in the drawing, the fluid pressure brake equipment may comprise a brake valve device 1, a reservoir 2 containing fluid under pressure, a brake chamber 3, and a quick application and release valve device 4.

According to my invention, the quick application and release valve device 4 may comprise casing sections 5 and 6 and a pair of flexible diaphragms 7 and 8. Said diaphragms are spaced apart by means of a spacing ring 9 and the parts are assembled with the casing sections 5 and 6 clamped on the outer opposite sides of the diaphragms.

The diaphragm chambers 10 and 11 are connected together by a passage 12 and diaphragm chamber 11 is connected by pipe 13 to the brake chamber 3. A plug 14 is screwed into the central portion of the casing section and extends into the chamber 11 so that the upper face is in close proximity to the diaphragm 8 and an atmospheric exhaust port 15 is provided through said plug. A valve chamber 16 is provided in the casing section 5 and said chamber is connected by pipe 17 to the reservoir 2. Contained in said valve chamber is a valve 18 having a stem 19 adapted to engage the diaphragm 7. The chamber 20 between the diaphragms 7 and 8 is connected by pipe 21 to the brake valve device 1.

In operation, the parts of the quick application and release valve device 4 are in the positions shown in the drawing when the brake valve device is in release position and there is no fluid pressure in chamber 20. In this position, the diaphragm 8 is free from engagement with the seating face or plug 14, so that the brake chamber 3 is now open to the atmosphere by way of chamber 11 and the exhaust port 15.

If it is desired to apply the brakes, the brake valve device 1 is turned to application position, in which fluid under pressure is supplied through pipe 21 to chamber 20. The diaphragms 7 and 8 are then moved outwardly by fluid pressure in chamber 20 so that the diaphragm 8 seats on the top of plug 14 closing off the exhaust port 15 from the brake chamber 3, while diaphragm 7 acts on the stem 19 to lift the valve 18 from its seat, so that fluid under pressure is supplied from the reservoir 2 through pipe 17 to valve chamber 16 and thence flows past the open valve 18 to diaphragm chamber 10. From chamber 10 fluid flows through passage 12 to chamber 11 and thence through pipe 13 to the brake chamber 3, so that the brakes are applied.

The brakes may be released by turning the brake valve to release position, in which fluid is exhausted from chamber 20, so that the diaphragms 7 and 8 move to release position, permitting the valve 18 to seat, and opening the exhaust port 15 to the brake chamber 3.

Having now described my invention, what I claim as new and desire to secure by Letters Patent, is:—

1. The combination with a brake chamber, of a valve for controlling the supply of fluid under pressure to said chamber, a flexible diaphragm for operating said valve, a flexible diaphragm for controlling a port through which fluid is exhausted from said chamber, a chamber intermediate said diaphragms, said diaphragms being operated by an increase in pressure in said diaphragm chamber for opening said supply valve and for closing said exhaust valve, and means for controlling the fluid pressure in said diaphragm chamber.

2. The combination with a brake chamber, of a casing containing two spaced flexible diaphragms forming three chambers, two of said chambers being connected to each other and to the brake chamber, a valve operated by one diaphragm for supplying fluid under pressure to one of said connected chambers and thence to said brake chamber, an exhaust port controlled by the other diaphragm, through which fluid is released from the other connected chamber and thence from the brake chamber, and means for supplying fluid under pressure to the third diaphragm chamber to operate said diaphragms to open said supply valve and close said exhaust port.

In testimony whereof I have hereunto set my hand.

CHRISTOPHER P. CASS.